United States Patent
Lin et al.

(10) Patent No.: US 6,936,218 B2
(45) Date of Patent: Aug. 30, 2005

(54) SILVER BRAZE ALLOY

(75) Inventors: Wangen Lin, South Glastonbury, CT (US); Brian Schwartz, West Hartford, CT (US); Viktor Fedorovich Khorunov, Kiev (UA); F. Michael Hosking, Alburquerque, NM (US); Svitlana Vasylivna Maksymova, Kiev (UA)

(73) Assignee: United Technologies Corporation, Hartford, CT (US)

( * ) Notice: Subject to any disclaimer, the term of this patent is extended or adjusted under 35 U.S.C. 154(b) by 315 days.

(21) Appl. No.: 10/413,885

(22) Filed: Apr. 15, 2003

(65) Prior Publication Data

US 2003/0180176 A1 Sep. 25, 2003

Related U.S. Application Data

(63) Continuation of application No. 09/752,000, filed on Dec. 29, 2000, now Pat. No. 6,596,229.

(51) Int. Cl.[7] .............................. C22C 5/08; B23K 35/30
(52) U.S. Cl. ....................................... 420/502; 148/430
(58) Field of Search ........................... 420/502; 148/430

(56) References Cited

U.S. PATENT DOCUMENTS

| | | | | |
|---|---|---|---|---|
| 2,138,638 A | * | 11/1938 | Leach | 420/502 |
| 2,196,303 A | * | 4/1940 | Hensel et al. | 420/502 |
| 2,303,272 A | * | 11/1942 | Haskell | 420/502 |

FOREIGN PATENT DOCUMENTS

| | | | | |
|---|---|---|---|---|
| JP | 53-065219 A | * | 6/1978 |
| JP | 57-149092 A | * | 9/1982 |
| JP | 57-149093 A | * | 9/1982 |
| JP | 61-216887 A | * | 9/1986 |

* cited by examiner

*Primary Examiner*—Roy King
*Assistant Examiner*—Harry D. Wilkins, III
(74) *Attorney, Agent, or Firm*—Bachman & LaPointe, P.C.

(57) ABSTRACT

The present invention relates to a silver braze alloy having improved wetting properties. The silver braze alloy consists essentially of from about 52.25 wt % to about 57.0 wt % silver, from about 38.95 to about 43.0 wt % copper, from about 0.5 wt % to about 5.5 wt %, preferably from about 1.0 wt % to about 5.5 wt %, manganese, and up to about 2.5 wt %, preferably from about 1.5 wt % to about 2.5 wt %, nickel. The alloy further may contain 0.15 wt % total of other trace elements.

2 Claims, 1 Drawing Sheet

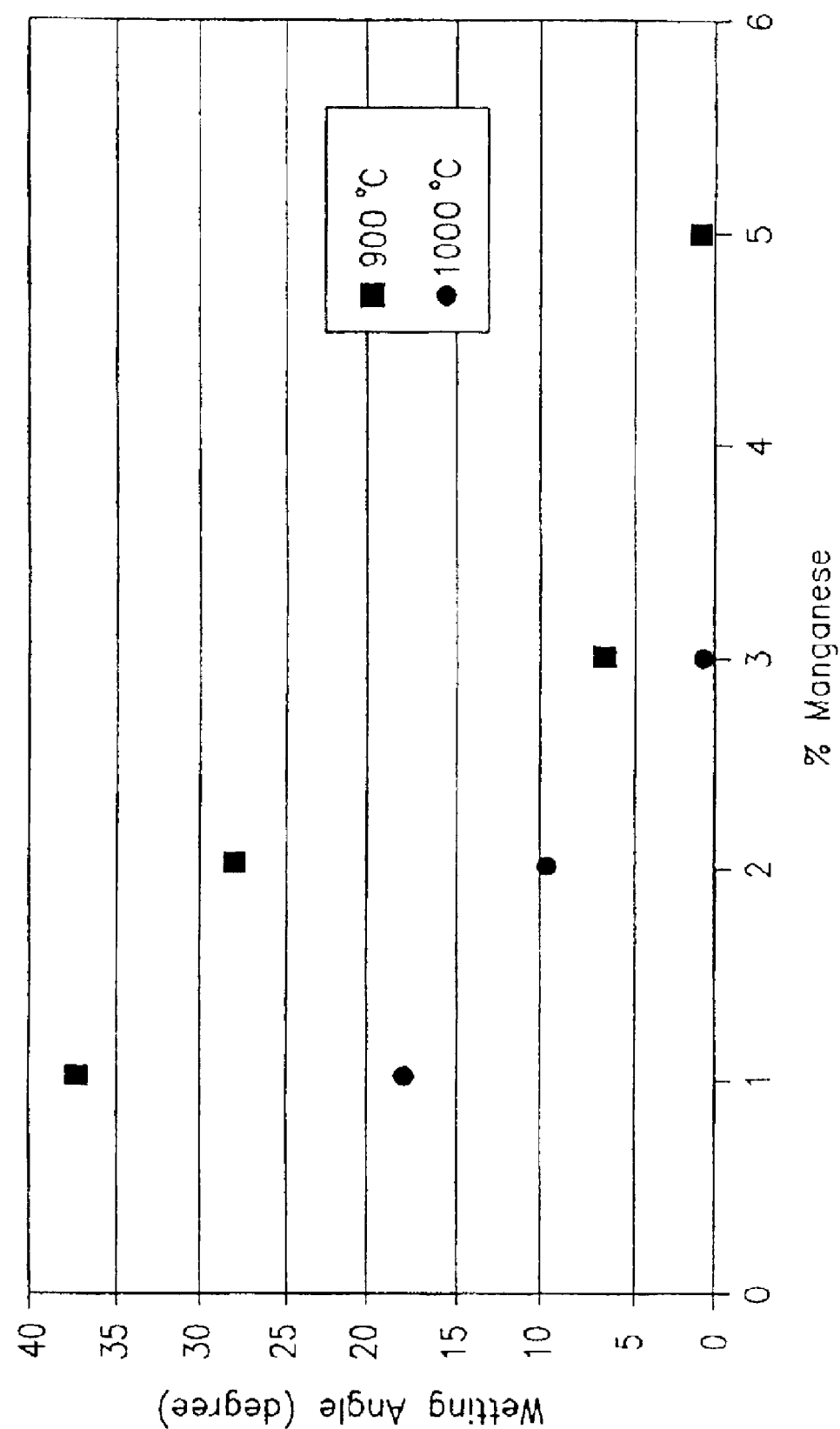

SILVER BRAZE ALLOY

CROSS-REFERENCE TO RELATED APPLICATION(S)

This application is a continuation application of U.S. patent application Ser. No. 09/752,000, filed Dec. 29, 2000 now U.S. Pat. No. 6,596,229, entitled SILVER BRAZE ALLOY, by Wangen Lin et al.

BACKGROUND OF THE INVENTION

The present invention relates to a silver brazing alloy and to a method of brazing metal parts.

It is known to torch braze, induction braze, furnace braze, or vacuum braze metal parts, such as steel parts, using non-ferrous brazing alloys, also known as filler metals. Typical filler metals include silver, gold, nickel, and copper brazing alloys. Silver brazing alloys are more costly and, in general, melt at lower temperatures than copper alloys.

One silver brazing alloy which has been used in the prior art is an alloy containing 56 wt % silver, 42 wt % copper, and 2.0 wt % nickel. Despite the wide spread use of this silver brazing alloy, there remains a need for an alloy which has improved brazing characteristics, particularly wettability.

SUMMARY OF THE INVENTION

Accordingly, it is an object of the present invention to provide a silver braze alloy having improved wettability.

It is a further object of the present invention to provide an improved brazing method which does not require nickel plating of a stainless steel substrate prior to brazing.

The foregoing objects are attained by the silver braze alloy and the brazing method of the present invention.

In accordance with the present invention, a silver braze alloy consists essentially of from about 52.25 wt % to about 57.0 wt % silver, from about 38.95 wt % to about 43.0 wt % copper, from about 0.5 wt % to about 5.5 wt %, preferably from about 1.0 wt % to about 5.5 wt %, manganese and up to about 2.5 wt %, preferably from about 1.5 wt % to about 2.5 wt % nickel.

A method for brazing a part in accordance with the present invention broadly comprises providing an article formed from a ferrous material, applying a brazing material to the article formed from an alloy consisting essentially of from about 52.25 wt % to about 57.0 wt % silver, from about 38.95 wt % to about 43.0 wt % copper, from about 0.5 wt % to about 5.5 wt % manganese, and up to about 2.5 wt % nickel, and heating the article and the brazing material at a temperature in the range of from about 900° C. to about 1050° C. for a time period sufficient to melt the brazing material.

Other details of the silver braze alloy and the method of the present invention, as well as other objects and advantages attendant thereto, are set forth in the following detailed description and the accompanying drawing.

BRIEF DESCRIPTION OF THE DRAWING

The FIGURE is a graph showing the wetting angle which can be obtained by the alloys in accordance with the present invention as a function of the manganese content of the alloy.

DETAILED DESCRIPTION OF THE PREFERRED EMBODIMENT(S)

A silver braze alloy in accordance with the present invention consists essentially of from about 52.25 wt % to about 57.0 wt % silver, from about 38.95 wt % to about 43.0 wt % copper, from about 0.5 wt % to about 5.5 wt %, preferably from about 1.0 wt % to about 5.5 wt %, manganese and up to about 2.5 wt %, preferably from about 1.5 wt % to about 2.5 wt %, nickel. The alloys of the present invention may also contain up to about 0.15 wt % total of other trace elements such as iron, zinc, silicon, phosphorous, sulfur, platinum, palladium, lead, gold, aluminum, magnesium, tin, germanium, carbon, and oxygen. A manganese addition within the foregoing ranges has been found to improve the brazing characteristics of the alloy of the present invention, particularly the wetting characteristics, as compared to a silver-copper-nickel brazing alloy consisting of 56 wt % silver, 42 wt % copper, and 2.0 wt % nickel.

Particularly useful brazing alloys in accordance with the present invention include: (1) a silver brazing alloy consisting essentially of 56 wt % silver, 42 wt % copper and 2.0 wt % manganese; and (2) a silver brazing alloy consisting essentially of 0.5 to 5.5 wt % manganese with the remaining composition proportional to the 56 wt % silver, 42 wt % copper, and 2.0 wt % nickel alloy.

The silver braze alloys of the present invention may be formed in any suitable manner known in the art and may be cast using any suitable technique known in the art into any desired form. For example, the silver braze alloys of the present invention can be in strip form, wire form, rod form, sheet form, foil form, pig form, powder form, shot form, chip form, paste form.

The silver braze alloys of the present invention may be brazed at a temperature in the range of from about 900° C. to about 1050° C., preferably from about 950° C. to about 1050° C., for a time sufficient to melt the brazing alloy onto a substrate formed from a ferrous material such as steel and stainless steel. Using the alloys of the present invention, brazing can be done using a furnace, locally using a torch, using an induction heater, dipped in a braze or flux bath, resistance heated, laser heated, or infrared heated. Depending on the brazing technique being employed, brazing may be carried out in an inert gas atmosphere, such as an argon atmosphere, or some other type of protective atmosphere. The silver braze alloy of the present invention melts at the aforementioned brazing temperatures and readily wets the ferrous substrate material to be joined without melting the ferrous substrate material.

The silver braze alloys of the present invention may be used to braze steel surfaces, particularly stainless steel surfaces. One of the advantages of the silver braze alloys of the present invention is that in an inert gas atmosphere, such as an argon atmosphere, no flux needs to be used and no nickel plating of the ferrous substrate material is required.

It has been found that the silver brazing alloys of the present invention have better wettability and flow characteristics than other brazing alloys such as an alloy consisting of 56 wt % silver, 42 wt % copper, and 2.0 wt % nickel.

To demonstrate the improved properties of the alloys of the present invention, a controlled amount of braze alloy consistent with the alloys of the present invention were applied to a series of stainless steel pieces. The braze volume was kept small to prevent excessive spreading of the alloy during the test. Each sample was then heated to a braze temperature of 900° C. or 1000° C. in a brazing furnace under a protective argon atmosphere. The braze alloy under the aforementioned brazing conditions melted and formed a wetting angle with the stainless steel piece. The angle at the line of contact between the liquid or solidified braze alloy and the stainless steel piece was then measured. This was done either in situ or after the piece had been cooled to room temperature. The resulting angle is an indicator of wettability. The lower the contact or wetting angle, the better the wetting behavior between the silver braze alloy and the base material. As can be seen from FIG. 1, the braze alloys of the present invention heated to a temperature of 1000° C. exhibited wetting angles in the range of from approximately 1 degree to about 19 degrees and braze alloys of the present invention heated to a temperature of 900° C. exhibited wetting angles which ranged from approximately 1 degree to about 37 degrees.

The typical wetting angle for a 56Ag—42Cu—2Ni alloy can range anywhere from 10 to 90 degrees depending on the surface conditions of the stainless steel and the brazing temperature. As can be seen from the foregoing discussion, the silver brazing alloys of the present invention significantly reduce this wide range of wetting variability, producing generally low wetting angles and improved braze flow. The foregoing test shows that the higher the manganese content of the alloy, the lower the wetting angle. FIG. 1 clearly shows that alloys in accordance with the present invention having a manganese content greater than about 1.0 wt % to about 5.0 wt % provide excellent wettability properties.

It is apparent that there has been provided in accordance with the present invention a silver braze alloy which fully meets the foregoing objects, means and advantages. While the present invention has been described in the context of specific embodiments thereof, other alternatives, modifications, and variations will become apparent to those skilled in the art having read the foregoing description. Therefore, it is intended to embrace those alternatives, modifications, and variations as fall within the broad scope of the appended claims.

What is claimed is:

1. A silver braze alloy consisting of from 52.25 wt % to 57.0 wt % silver, from 38.95 to 43.0 wt % copper, and from 0.5 wt % to 5.5 wt % manganese.

2. A silver braze alloy according to claim 1, wherein said manganese content is in a range from about 1.0 wt % to about 5.5 wt %.

* * * * *